(12) United States Patent
Johansen et al.

(10) Patent No.: US 8,619,951 B2
(45) Date of Patent: Dec. 31, 2013

(54) SYSTEMS AND METHODS TO SECURELY COLLECT DATA OVER A TELEPHONE

(75) Inventors: Ronnie D. Johansen, Highland, UT (US); Kolby M. Olsen, Lehi, UT (US)

(73) Assignee: Kombea Corporation, Lehi, UT (US)

( * ) Notice: Subject to any disclaimer, the term of this patent is extended or adjusted under 35 U.S.C. 154(b) by 240 days.

(21) Appl. No.: 12/961,192

(22) Filed: Dec. 6, 2010

(65) Prior Publication Data

US 2012/0140911 A1 Jun. 7, 2012

(51) Int. Cl.
*H04M 11/00* (2006.01)

(52) U.S. Cl.
USPC .................................. 379/93.02; 379/93.12

(58) Field of Classification Search
USPC ...................... 379/93.02, 91.01, 93.12, 93.26
See application file for complete search history.

(56) References Cited

U.S. PATENT DOCUMENTS

| 5,351,296 | A  | * | 9/1994  | Sullivan ............... 379/93.02 |
| 5,727,163 | A  | * | 3/1998  | Bezos .................. 379/91.01 |
| 7,142,840 | B1 | * | 11/2006 | Geddes et al. ........ 379/93.02 |
| 7,676,027 | B2 | * | 3/2010  | Laurent et al. ........ 379/88.13 |
| 8,275,115 | B1 | * | 9/2012  | Everingham et al. .... 379/265.02 |
| 2004/0193897 | A1 | * | 9/2004 | Van Volkenburgh ........ 713/189 |
| 2011/0228919 | A1 |   | 9/2011 | Tew et al. |

FOREIGN PATENT DOCUMENTS

GB 2473376 6/2012

* cited by examiner

*Primary Examiner* — Stella Woo
(74) *Attorney, Agent, or Firm* — Holland & Hart LLP

(57) ABSTRACT

A computer-implemented method to securely collect data over a telephone is described. Telephone communications between a customer and a customer service representative are monitored. At least one tone from a telephone keypad of the customer is detected. The at least one tone represents sensitive data for the customer. An audio output channel directed to the customer service representative is prevented from outputting a detectable tone from the telephone keypad of the customer. An indicator is provided to the customer service representative when detection of the at least one tone occurs.

20 Claims, 9 Drawing Sheets

SYSTEMS AND METHODS TO SECURELY COLLECT DATA OVER A TELEPHONE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand that the efficiency of these technologies increase. Improving the efficiency of computer technologies is important to anyone that uses and relies on computers.

Computing systems may be used by customer service representatives who collect data from customers over the phone. For example, these computing systems may execute applications that capture data communicated from the customer to the customer service representative. In some cases, the captured data are sensitive data. For example, the data may be credit card numbers, account numbers, and the like. The applications executing on the computing systems may not capture this sensitive data in a secure manner. As a result, the customer service representative may discover (or otherwise gain access) to this sensitive data. The customer service representative may then fraudulently misuse this data. Customers may be hesitant to provide this data over the phone.

Further, once a transaction between a customer and a customer service representative has been executed, the customer may later deny that such a transaction was authorized. As a result, companies may be required to refund money to the customer associated with the transaction. Current computing systems do not provide a secure manner to collect sensitive data. In addition, current systems do not decrease the occurrences of customers denying the authorization for the transaction. As a result, benefits may be realized by providing system and methods to securely collect data over a telephone and storing an authorization from the customer for later retrieval.

SUMMARY

According to at least one embodiment, a computer-implemented method to securely collect data over a telephone is described. Telephone communications between a customer and a customer service representative are monitored. At least one tone from a telephone keypad of the customer is detected. The at least one tone represents sensitive data for the customer. An audio output channel directed to the customer service representative is prevented from outputting a detectable tone from the telephone keypad of the customer. An indicator is provided to the customer service representative when detection of the at least one tone occurs.

In one embodiment, an authorization request may be transmitted to the customer. A response to the authorization request may be received. In one configuration, an authorization recording that includes a summary of a transaction between the customer and the customer service representative may be generated. The authorization recording may be transmitted to the customer.

In one example, the at least one tone from the telephone keypad of the customer that represents sensitive data for the customer may be masked. The masked at least one tone from the telephone keypad of the customer may be converted to an unmasked tone. In one embodiment, the detected at least one tone may be converted to sensitive data for the customer. The sensitive data for the customer may be transmitted to a secure data storage.

A computing device configured to securely collect data over a telephone is also described. The computing device may include a processor and memory in electronic communication with the processor. The computing device may further include a channel controlling application configured to monitor telephone communications between a customer and a customer service representative, and detect at least one tone from a telephone keypad of the customer. The at least one tone may represent sensitive data for the customer. The channel controlling application may be further configured to prevent an audio output channel directed to the customer service representative from outputting a detectable tone from the telephone keypad of the customer, and provide an indicator to the customer service representative when detection of the at least one tone occurs.

A computer-program product to securely collect data over a telephone is also described. The computer-program product may include a computer-readable medium having instructions thereon. The instructions may include code programmed to monitor telephone communications between a customer and a customer service representative, and code programmed to detect at least one tone from a telephone keypad of the customer. The at least one tone may represent sensitive data for the customer. The instructions may further include code programmed to prevent an audio output channel directed to the customer service representative from outputting a detectable tone from the telephone keypad of the customer, and code programmed to provide an indicator to the customer service representative when detection of the at least one tone occurs.

A multi-channel audio patch device configured to securely collect data over a telephone is also described. The device includes a plurality of multiplexers. Each multiplexer includes a plurality of audio input channels and a single audio output channel. The device further includes a microcontroller configured to provide control signals for the plurality of audio input channels and the single audio output channel for each of the plurality of multiplexers. The microcontroller may cancel the single output of a multiplexer directed to a customer service representative when audio tones from a telephone keypad of a customer are detected. One of the plurality of multiplexers may be configured to output an authorization recording to the customer that includes a summary of a transaction between the customer and the customer service representative.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
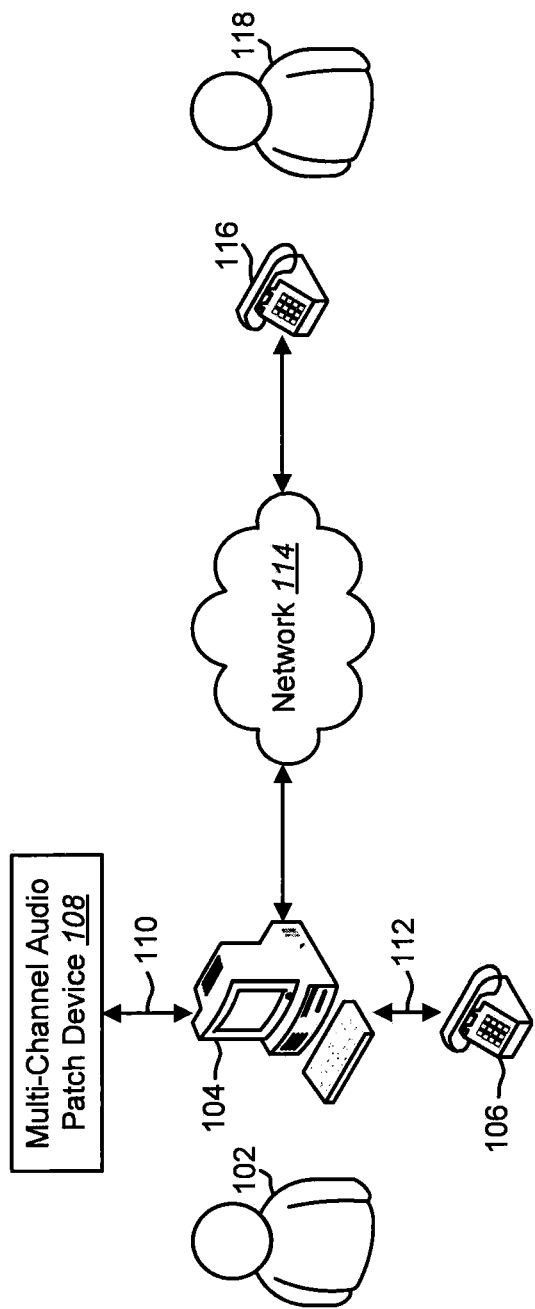
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Millions of phone calls take place each day where a caller gives (either audibly or via the phone keypad) a customer service representative (CSR) secure data (such as credit card details, social security numbers, account numbers, pins, answers to personal questions, and the like) over the phone. This is problematic for several reasons. For example, many callers may be unwilling to give this data over the phone, negatively impacting customer satisfaction, service costs, sales, accurate data collection, and the like. In addition, CSRs may be responsible for a large number of stolen identities each year. This may result in financial losses to consumers and companies (as well as lost confidence by consumers). In current call center environments, CSRs have the ability to capture the secure data provided from callers onto paper, personal computer editors, recording devices, removable media, etc. This captured data may then be fraudulently used by the CSR or by those to whom the CSR provides it to. Merchants may be responsible for protecting secure data (e.g., credit card numbers, social security numbers, etc.) where non-compliance and breaches may result in large penalties and lost confidence by consumers.

In addition to a CSR fraudulently using secure data of callers, callers may also participate in fraudulent activities. For example, in the case of credit cards, a caller may purchase products over the phone, provide a CSR with his/her credit card number to complete the transaction, and then later deny having authorized the charge to the credit card. This may result in merchant losses, chargebacks, and unrecovered merchandise.

Currently, interactive voice response (IVR) systems may enable callers to provide secure data via their phone keypad. The CSR may be required to transfer the customer to an IVR system to perform this data collection, followed by the customer potentially being transferred back to the same or a different CSR after the data have been collected by the IVR system. Information gathered by the IVR system may be sent to the CSR using computer telephony integration (CTI), generally in the form of automatically pulling up a customer's record based on some piece of secure data. This may require the caller to perform some activities within the IVR system and not remain connected with the CSR the entire conversation.

Current call center environments may include three-channel audio patch devices to provide the connections between a customer, a CSR, and a computing device used by the CSR. For example, when a customer is speaking with a CSR, the connection path between the customer and the CSR may be active. If the computing device is required to hear/play sounds from/to the customer, the connection between the customer's phone and the computing device of the CSR may be active. For example, when the customer provides secure data (such as a credit card number) via the phone's keypad, the connection to the computing device may be active so that the device may hear and capture the tones of the customer's phone keypad. These existing three channel audio patch devices, however, do not provide separate control of each of the input and output channels. As a result, the tones from the customer's phone keypad that represent secure data may be susceptible to interception by the CSR. In other words, when the customer provides tones via his/her phone's keypad, the audio output to the CSR may not be cancelled. As a result, the CSR may intercept the secure data provided by the customer.

In one embodiment, the present systems and methods may decrease identity theft and credit card fraud, saving consumers and companies a large amount of money per year. The present systems and methods also eliminate the viewing, unauthorized use, or theft of secure data provided over the phone.

In one configuration, the present systems and methods may enable a CSR to securely collect a caller's secure data (such as credit card numbers, social security numbers, and account numbers) over the phone. In addition, the present systems and methods may allow the CSR to remain on the phone with the caller the entire time, and the present systems and methods may enable the collection of the secure data without the CSR being able to view, hear, or otherwise have access to the secure data. In addition, the present systems and methods may allow the data to be collected without an application used by the CSR to store the secure data or otherwise visually provide the secure data to the CSR. As a result, the present systems and methods may eliminate the viewing, unauthorized use, and theft of the secure data.

In one embodiment, the secure collection of the data may be accomplished by the CSR requesting that the callers enter the secure data via their phone keypad, while the CSR remains engaged on the telephone line. The present systems and methods may prevent the CSR (or any unauthorized system) from gaining access to the secure data. In one configuration, the present systems and methods may mask the tones received from the caller's phone keypad so that authorized or unauthorized recordings of these tones cannot be used fraudulently. In addition, the present systems and methods may interpret the masked tones and provide an indicator to the CSR that the secure data has been successfully collected. Further, the present systems and methods may securely pass the data to authorized systems, such as credit card payment gateways. In addition, the present systems and methods may securely store the data for any needed or authorized retrieval.

In the case of credit card processing, the present systems and methods may add increased security to the transaction. For example, the present systems and methods may send a secure authorization code to the caller's phone (via short messaging service (SMS) or computer (via email). The CSR may be unable to submit the transaction unless the caller enters the authorization code via their phone keypad (in addition to the other secure credit card data) and submits the authorization code to the CSR.

In addition, just before a credit card transaction is processed, the present systems and methods may play a recorded message (i.e., authorization request) that requests the caller to authorize the charges by stating their name. The present systems and methods may create an audio recording of this authorization (i.e., authorization recording). The CSR may be unable to submit a transaction unless the authorization request message is played in full to the caller and the authorization recording has been recorded.

In one embodiment, when the transaction is complete, the present systems and methods may send an email and/or an SMS summary to the caller including the unsecured details of the transaction (i.e., amount, date, last four digits of the credit card, etc.) and an attached link to the authorization recording. The present systems and methods may securely store the transaction details along with the authorization recording, with the ability for merchants, third-party processors, or credit card companies to retrieve for purposes of disputes or fraud investigations.

FIG. 1 is a block diagram illustrating one embodiment of an environment 100 in which the present systems and methods may be implemented. In one configuration, a customer 118 and a CSR 102 may communicate with each other via a customer's telephone 116 and a CSR's telephone 106. The telephones 106, 116 may be landline phones, cellular phones, smartphones, and the like. The telephones 106, 116 may communicate with a computing device 104 used by the CSR 102. The communication between the telephone 116 and the computing device 104 may be facilitated via a network connection 114. An example of the network connection 114 may be a public switched telephone network (PSTN), a cellular network, and the like. The CSR 102 may receive audio information from the customer 118 via the CSR telephone 106. The CSR telephone 106 may also allow the CSR 102 to provide audio information back to the customer 118. For example, the CSR telephone 106 may include a CSR microphone to receive audio information as input from the CSR 102, and the CSR telephone 106 may include a CSR headset to output audio information from the customer 118 to the CSR 102. The CRS telephone 106 may communicate with the computing device 104 via a communications link 112. Information received from the customer's telephone 116 by the computing device 104 may be displayed to the CSR 102 via a display of the computing device 104.

In one embodiment, the computing device 104 may communicate with a multi-channel audio patch device 108. The computing device 104 and the multi-channel audio patch device 108 may communicate via a communications link 110. In one embodiment, the communications link 110 may be a universal serial bus (USB) link. The multi-channel audio patch device 108 may include input and output channels for the CSR 102, the computing device 104, and the customer 118. The details regarding the multi-channel audio patch device 108 will be described in further detail below. In one embodiment, the computing device 104 may include a channel controlling application that may regulate and control the audio input and output channels of the multi-channel audio patch device 108.

Figure 2:
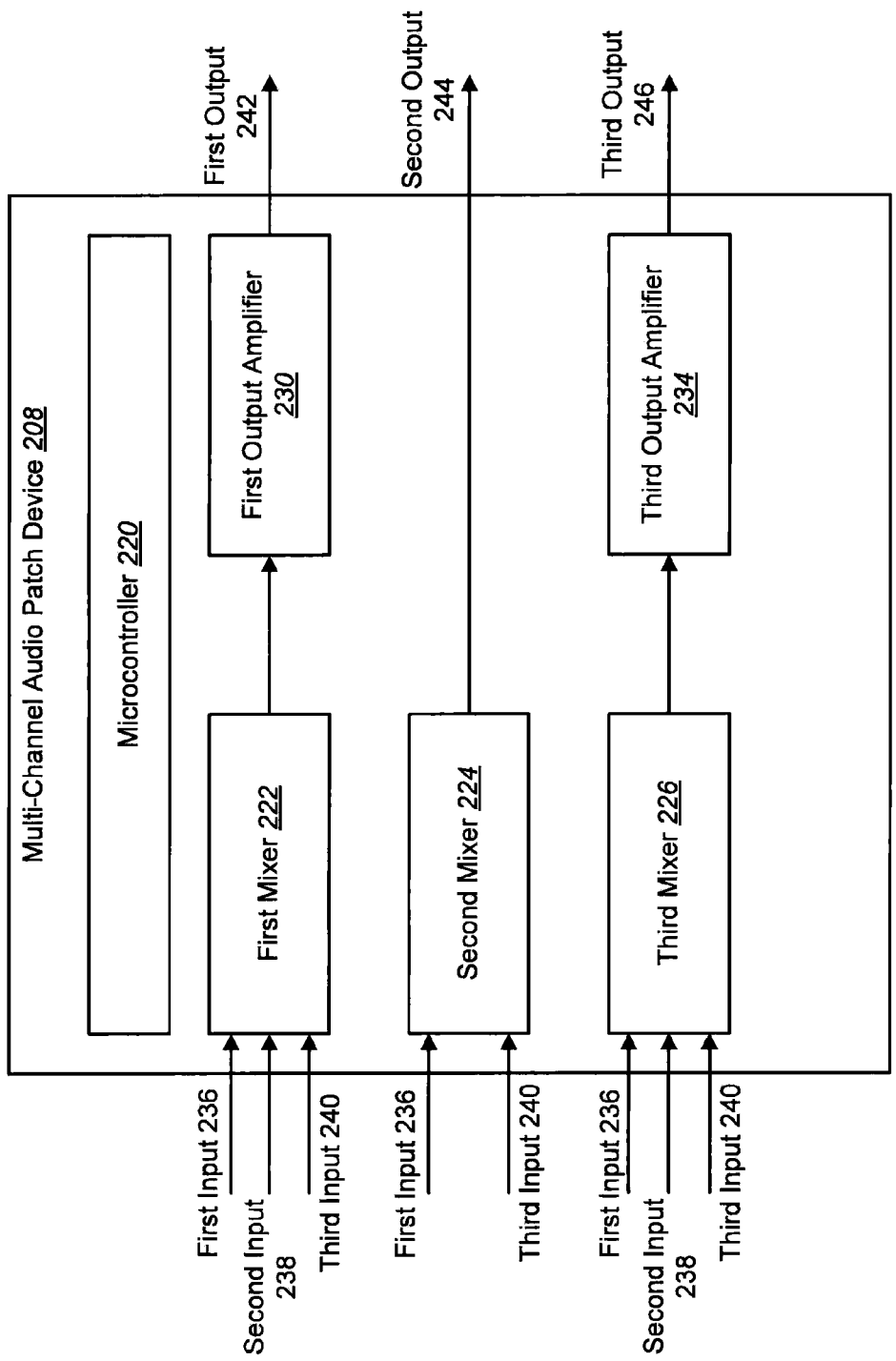
FIG. 2 is a block diagram illustrating one embodiment of a multi-channel audio patch device.

FIG. 2 is a block diagram illustrating one embodiment of a multi-channel audio patch device 208. In one configuration, the device 208 may include one or more mixers 222, 224, 226. Each mixer 222, 224, 226 may include at least one input channel and a single output. As a result, each mixer 222, 224, 226 may function as a multiplexer. For example, a first mixer 222 and a third mixer 226 may include three different input channels 236, 238, 240. The second mixer 224 may include two input channels 236, 240. In one configuration, each mixer 222, 224, 226 may be a multiplexer in which multiple inputs may be provided to the mixer while only a single output is provided from the mixer.

In one embodiment, a microcontroller 220 may control which outputs of the various mixers 222, 224, 226 are active. For example, the microcontroller 220 may cancel (or otherwise mute) outputs 244, 246 from the second mixer 224 and the third mixer 226 so that only the output 242 from first mixer 222 is audible. The outputs 242, 246 of the first mixer 222 and the third mixer 226 may be amplified via a first output amplifier 230 and a third output amplifier 234, respectively. In one configuration, the second mixer 224 may not be associated with an output amplifier. In other words, the output from the second mixer 224 may not be amplified.

Figure 3:
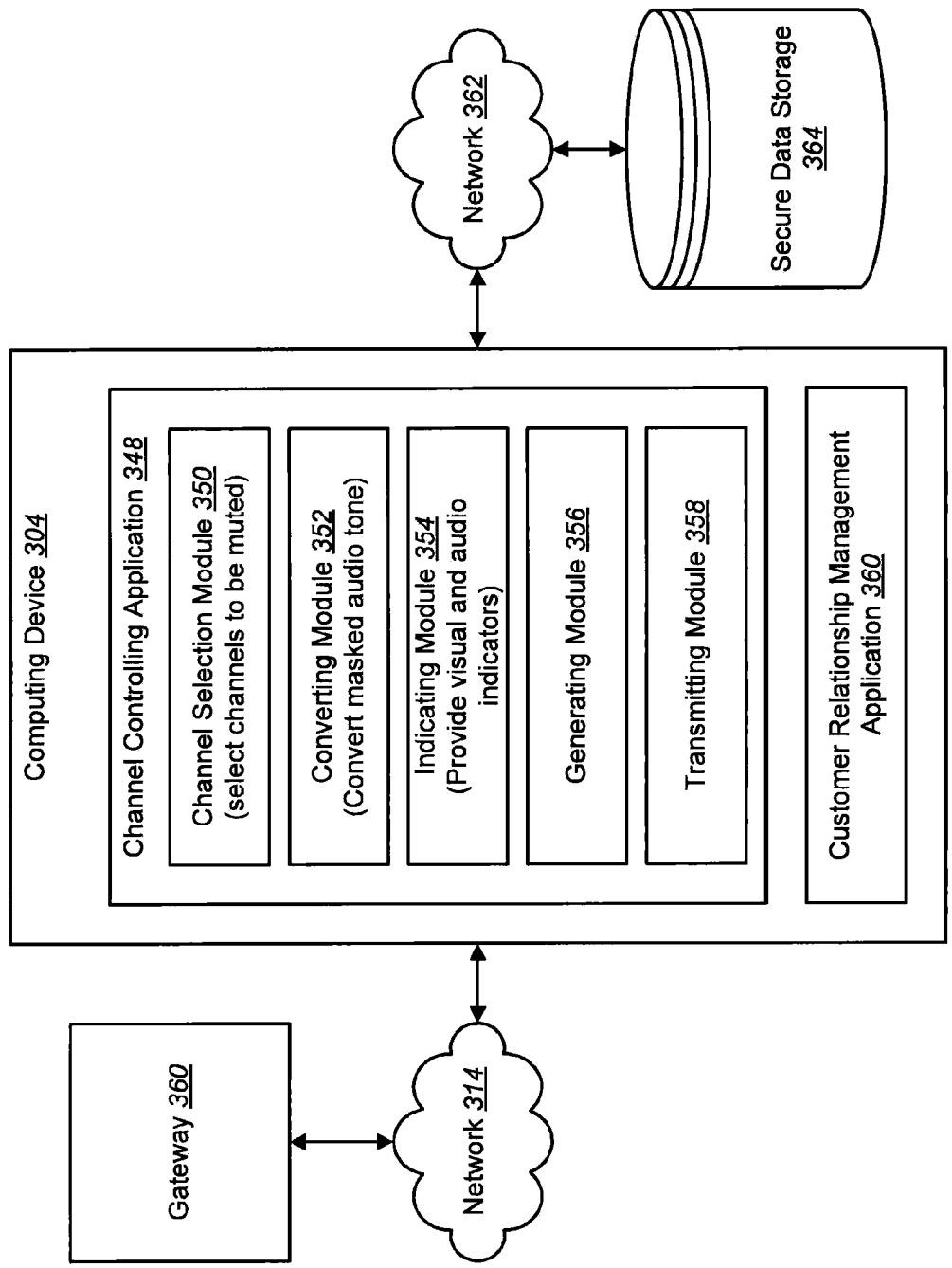
FIG. 3 is a block diagram illustrating one embodiment of a computing device that executes a channel controlling application and a customer relationship management application.

FIG. 3 is a block diagram illustrating one embodiment of a computing device 304 that executes a channel controlling application 348 and a customer relationship management application 360, in accordance with the present systems and methods. In one configuration, the channel controlling application 348 may communicate with a multi-channel audio patch device 108 to provide instructions to the microcontroller 220 as to which output channels should be cancelled (or otherwise muted).

In one embodiment, the channel controlling application 348 may include a channel selection module 350. The channel selection module 350 may select output channels from the multi-channel audio patch device 108 that are to be cancelled. In other words, the channel selection module 350 controls the audio level of each output channel of the multi-channel audio patch device 108. The channel controlling application 348 may also include a converting module 352. In one embodiment, a customer 118 may provide secure data to a CSR 102 via the customer's telephone keypad 106. The microcontroller 220 may not cancel (or mute) an output channel to the headset of the CSR 102. In one embodiment, the multi-channel audio patch device 108 may mask or otherwise alter the tones received from the customer's telephone 116. As a result, the output channel of the multi-channel audio patch device 108 that is directed to the CSR 102 may not output recognizable tones to the CSR 102. As a result, the CSR 102 may not be able to interpret the tones provided via the customer's telephone 106. The converting module 352 may convert the masked tones back to the correct tones in order to interpret the data represented by the correct tones.

An indicating module 354 may provide visual and audio indicators to the CSR 102 while the customer 118 is providing the secure data via the keypad of the customer's telephone 116. For example, the CSR 102 may interface with the customer relationship management application 360. The application 360 may include data fields that are populated by the secure data provided by the customer 118 via the keypad of the customer's telephone 116. The indicating module 354 may populate these data fields with an indicator as the customer 118 provides the secure data via the keypad. The indicator populating the data fields of the application 360 may be a generic symbol that does not reveal the actual data provided by the customer 118. For example, as the customer 118 enters a credit card number via the keypad of the customer telephone 116, the data fields of the application 360 that store credit card numbers may be populated with a generic symbol (e.g., an asterisk) so that the CSR 102 is unable to obtain access to the actual credit card number. The indicating module 354 may also provide an audible indicator to the CSR 102 (such as a masked tone) so that the CSR 102 is aware that the customer is entering secure data via the phone's keypad. In one example, the microcontroller 220 may not cancel the channel output to the CSR 102 while the customer 118 is entering secure data via the phone's keypad. As a result, the CSR 102 is able to continue in communications with the customer 118 while the customer 118 is entering the secure data via the customer's telephone keypad.

In one configuration, a generating module 356 may generate an authorization request message to be transmitted via a transmitting module 358 to the customer 118. The authorization request may request that the customer 118 authorize a pending transaction by providing the customer's name, or other authorization code. The generating module 356 may further generate an authorization recording which may indicate to the user the details of a pending transaction. The transmitting module 358 may transmit the authorization recording to the customer. In addition, the channel controlling application 348 may store a copy of the authorization recording for later retrieval should the customer 118 deny the authorization of the transaction.

In one embodiment, the transmitting module 358 may transmit the secure data provided by the customer 118 to a gateway 360 via a network connection 314. The gateway 360 may be a handling system for a credit card company. In addition, the transmitting module 358 may transmit the secure data provided by the customer 118 to a secure data storage 364 via a network connection 362. The transmitting module 358 may also transmit the authorization recording that was played to the user 118 to the secure data storage 364 via the network connection 362. Once a transaction is finalized, the transmitting module 358 may transmit a summary of the non-secure transaction details to the customer (e.g., amount of purchase, date of purchase, shipping address, billing address, etc.). In addition, the transmitting module 358 may include a link to the stored authorization recording. As a result, the customer 118 may access the stored authorization recording in the secure data storage 364 via the link.

Figure 4:
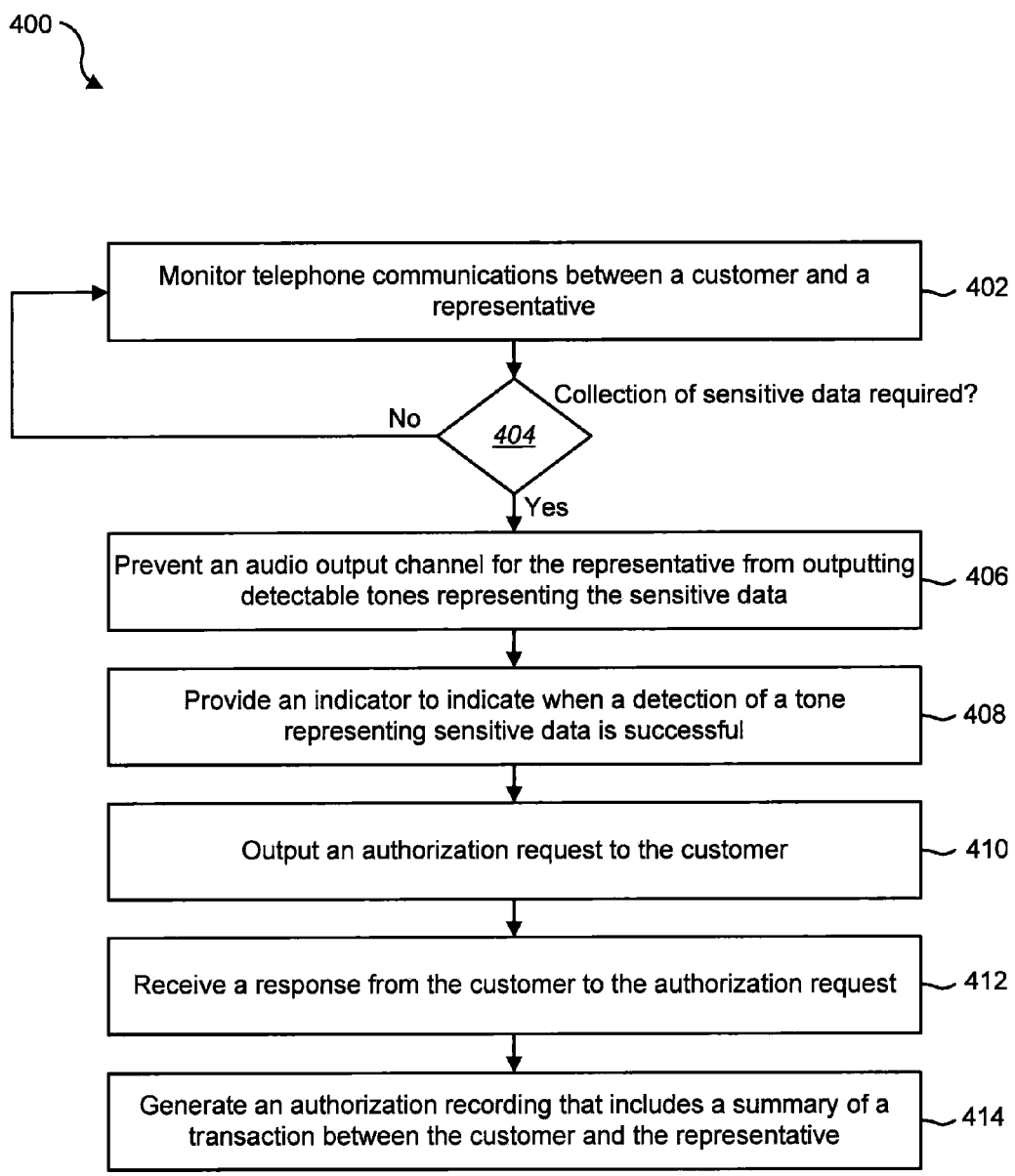
FIG. 4 is a flow diagram illustrating one embodiment of a method to securely collect data over a telephone.

FIG. 4 is a flow diagram illustrating one embodiment of a method 400 to securely collect data over a telephone. In one embodiment, the method 400 may be implemented by the channel controlling application 348.

In one embodiment, telephone communications between a customer and a CSR may be monitored 402. A determination 404 may be made as to whether a collection of sensitive data is required. If it is determined 404 that a collection of sensitive data is not required, the method 400 may return to monitor telephone communications between the customer and the representative. If, however, it is determined that a collection of sensitive data is required, an audio output channel for the representative may be prevented 406 from outputting detectable tones representing the sensitive data. In addition, an indicator may be provided 408 to indicate when a detection of a tone representing sensitive data is successful. Further, an authorization request may be outputted 410 to the customer. In one configuration, a response may be received 412 from the customer to the authorization request. For example, the authorization request may include a request for the customer to state his/her name. The received response may include the customer stating his/her name.

In one configuration, an authorization recording may be generated 414. In one example, the recording may be an automated recording that states a summary of the transaction between the customer and the representative. For example, the recording may include the statement by the customer of his/her name as well as a statement authorizing the transaction to be executed. As an example, the transaction may include the customer purchasing an item using a credit card. The authorization recording may include the customer's name as well as a summary detailing the item to be purchased and the last four digits of the customer's credit card. The recording may be transmitted to the customer as well as stored in the secure data storage. As a result, if the customer later denies having authorized the transaction to occur, a merchant may access the stored authorization recording that indicates the customer did authorize the transaction to take place.

Figure 5:
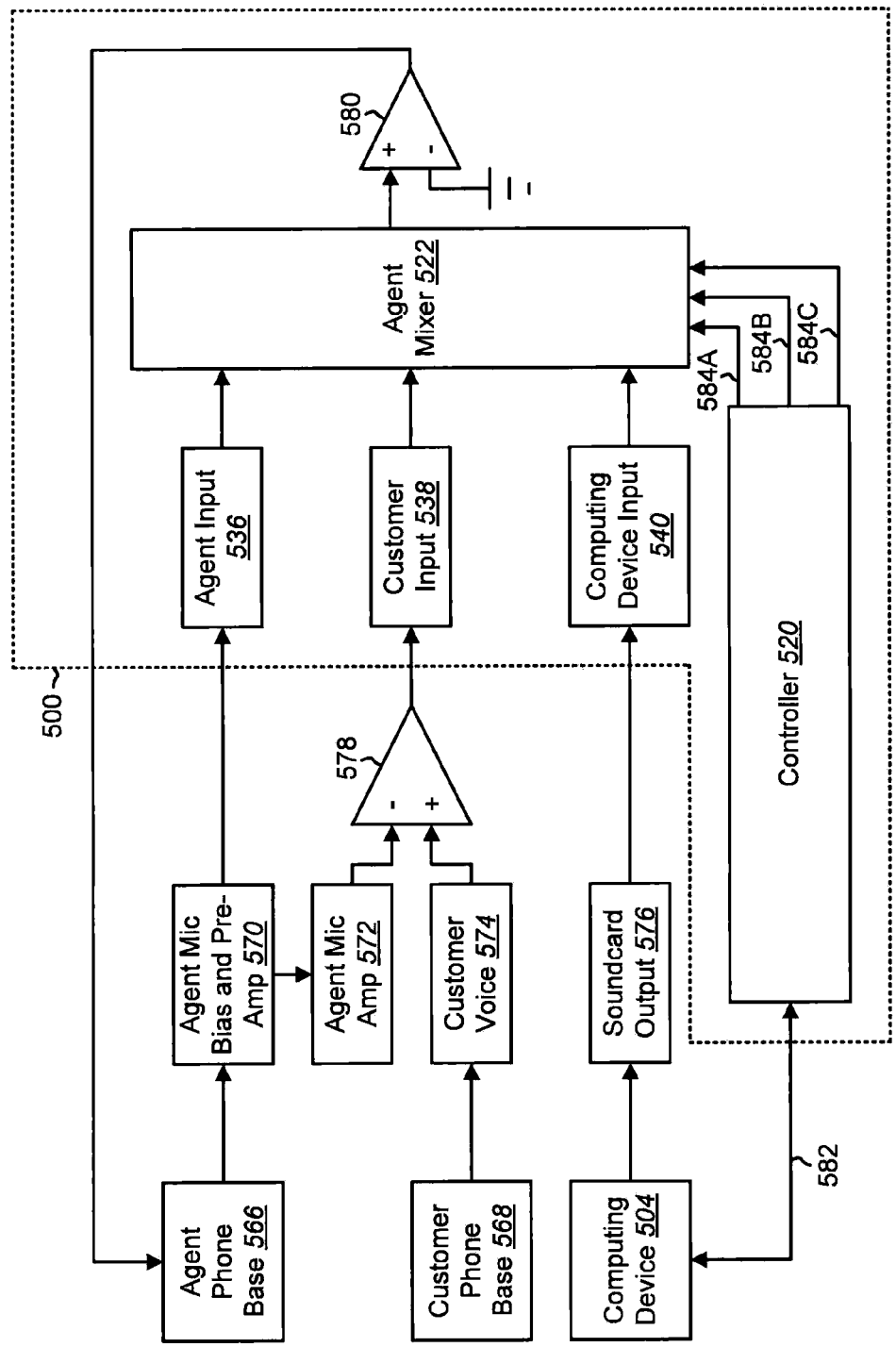
FIG. 5 is a block diagram illustrating one embodiment of a multi-channel audio patch device.

FIG. 5 is a block diagram illustrating one embodiment of a multi-channel audio patch device 500, in accordance with the present systems and methods. In one example, the device 500 may receive instructions via a communications link 582 between a controller 520 of the device 500 and a computing device 504.

In one embodiment, a CSR 102 may provide input to the device 500 and receive output from the device via an agent phone base 566. The agent phone base 566 may include a microphone which allows the CSR 102 to provide audio input. The agent phone base 566 may also include a headset that provides audio output to the CSR 102. In one configuration, audio input provided to the microphone may be biased and pre-amplified via an agent microphone bias and pre-amplification component 570. Output from this component 570 may be input to an agent microphone amplifier 572. Output from this component 570 may also serve as agent input 536 to an agent mixer 522.

In one example, a customer 118 may provide audio input and receive audio output via a customer phone base 568. Output from the customer phone base 568 may be referred to as the customer's voice 574. The customer's voice 574 and the amplified input from the agent's microphone 572 may be applied to a differential amplifier 578. The output of the amplifier 578 may be referred to as customer input 538 that is input to the agent mixer 522.

The computing device 504 may include a soundcard to provide audio output from and audio input to the computing device 504. Audio output from the computing device 504 may be referred to as soundcard output 576. The soundcard output 576 may serve as computing device input 540 to the agent mixer 522. As a result, the agent mixer 522 may include three input channels (e.g., agent input 536, customer input 538, and computing device input 540). The agent mixer 522 may also provide a single output to the agent phone base 566. In one example, the single output may be provided to a differential amplifier 580.

As previously explained, the computing device 504 may provide instructions to the controller 520 via a communications link 582 (such as a USB connection). The instructions may indicate which input channels are to be cancelled and not outputted from the mixer 522. For example, the controller 520 may include three cancellation controls 584A, 584B, 584C. These controls 584A, 584B, 584C may control the audio output levels of the three input channels 536, 538, 540. For example, if the customer input 538 includes tones provided by the customer 118 via the phone's keypad, the output of the agent mixer 522 (which is input to the agent phone base 566) may be muted or cancelled. In one embodiment, a cancellation signal is applied to the output of the mixer 522 so as to allow the agent phone base 566 to remain in communications with the customer phone base 568 while the customer is entering data via the customer's phone keypad. The cancellation signal applied to the output of the agent mixer 522 may mask the customer input 538 so that the tones are unrecognizable to the CSR 102 or a customer service management application being used by the CSR 102. By cancelling the output of the agent mixer 522 when the customer input 538 includes tones that represent sensitive data, the CSR 102 is unable to record or otherwise gain access to the secure data provided by the customer 118.

Figure 6:
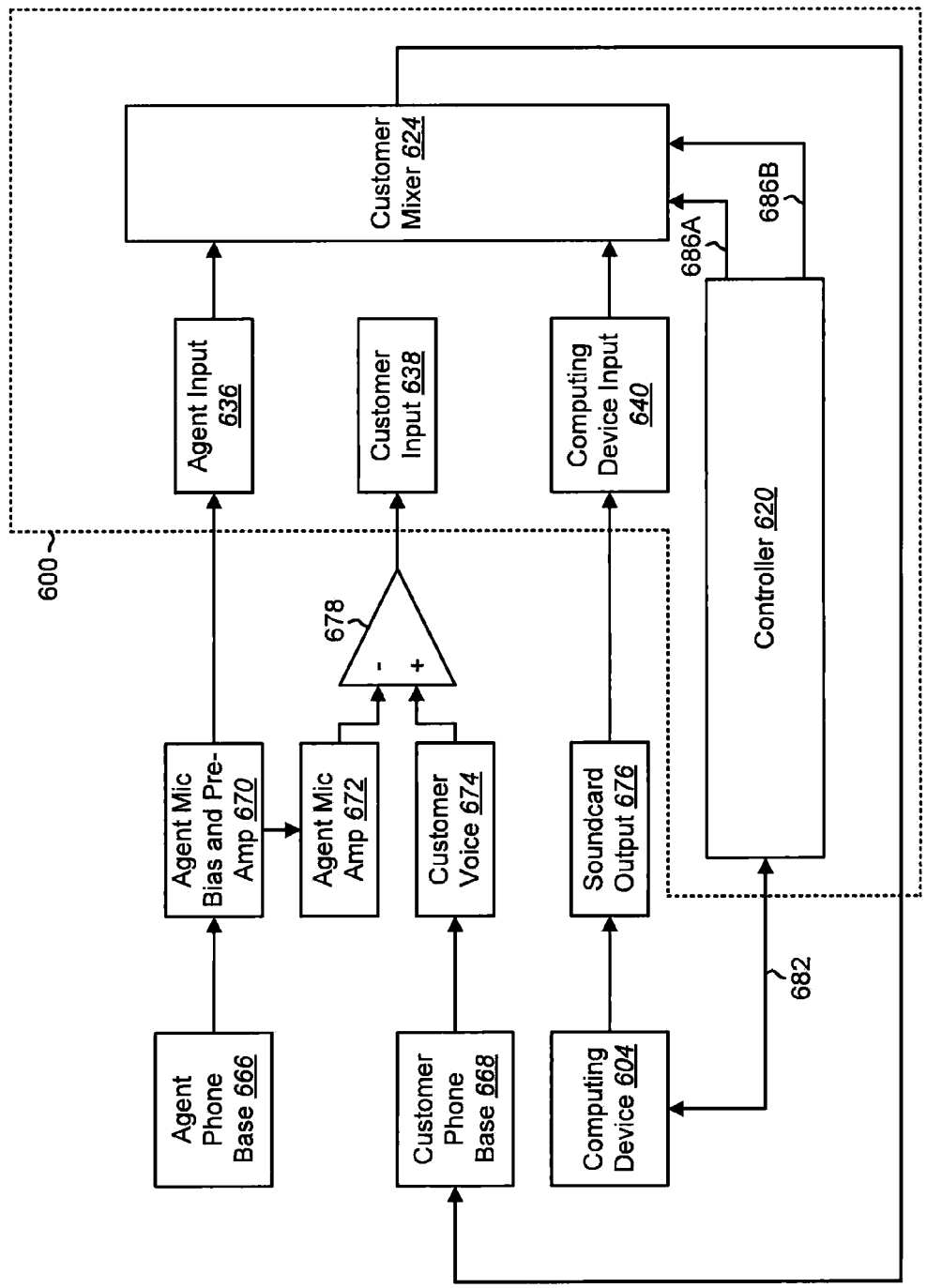
FIG. 6 is a block diagram illustrating one embodiment of a multi-channel audio patch device.

FIG. 6 is a block diagram illustrating one embodiment of a multi-channel audio patch device 600, in accordance with the present systems and methods. In one example, the device 600 may receive instructions via a communications link 682 between a controller 620 of the device 600 and a computing device 604.

In one embodiment, a CSR 102 may provide input to the device 600 and receive output from the device via an agent phone base 666. The agent phone base 666 may include a microphone which allows the CSR 102 to provide audio input. The agent phone base 666 may also include a headset that provides audio output to the CSR 102. In one configuration, audio input provided to the microphone may be biased and pre-amplified via an agent microphone bias and pre-amplification component 670. Output from this component 670 may be input to an agent microphone amplifier 672. Output from this component 670 may also serve as agent input 636 to a customer mixer 624.

In one example, a customer 118 may provide audio input and receive audio output via a customer phone base 668. Output from the customer phone base 668 may be referred to as the customer's voice 674. The customer's voice 674 and the amplified input from the agent's microphone 672 may be applied to a differential amplifier 678. The output of the amplifier 678 may be referred to as customer input 638. In one embodiment, customer input 638 may not be input to the customer mixer 624.

The computing device 604 may include a soundcard to provide audio output from and audio input to the computing device 604. Audio output from the computing device 604 may be referred to as soundcard output 676. The soundcard output 676 may serve as computing device input 640 to the customer mixer 624. As a result, the customer mixer 624 may include two input channels (e.g., agent input 636 and computing device input 640). The customer mixer 624 may also provide a single output to the customer phone base 668.

As previously explained, the computing device 604 may provide instructions to the controller 620 via a communications link 682 (such as a USB connection). The instructions may indicate which input channels are to be cancelled and not outputted from the mixer 624. For example, the controller 620 may include two cancellation controls 686A, 686B. These controls 686A, 686B, may control the audio output levels of the input channels 636, 640. For example, if the agent input 636 includes instructions from the CSR 102 to the customer 118, the controller 620 may mute the audio levels of the computing device input 640 so that the customer 118 only hears the instructions from the CSR 102.

Figure 7:
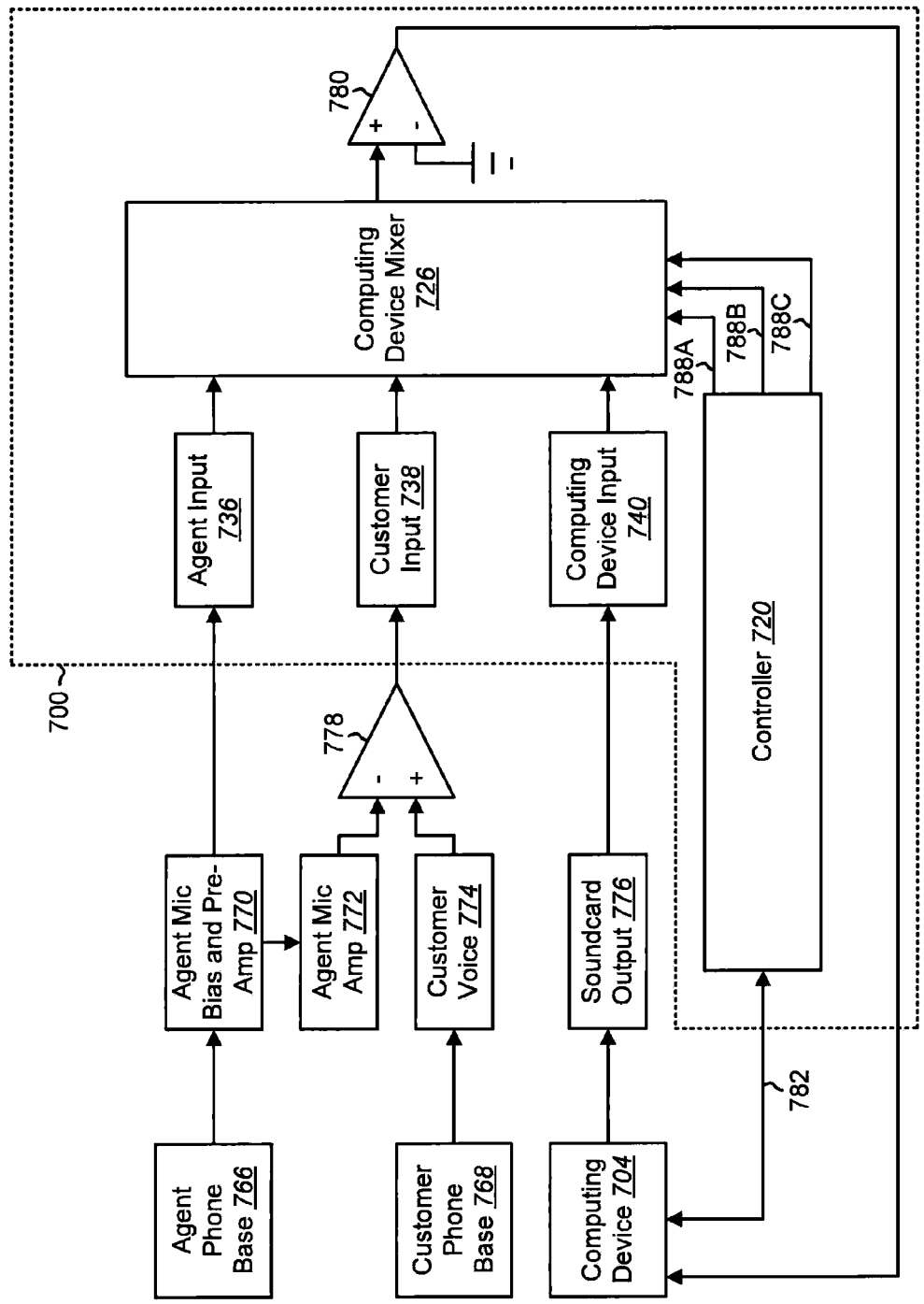
FIG. 7 is a block diagram illustrating one embodiment of a multi-channel audio patch device.

FIG. 7 is a block diagram illustrating one embodiment of a multi-channel audio patch device 700, in accordance with the present systems and methods. In one example, the device 700 may receive instructions via a communications link 782 between a controller 720 of the device 700 and a computing device 704.

In one embodiment, a CSR 102 may provide input to the device 700 and receive output from the device via an agent phone base 766. The agent phone base 766 may include a microphone which allows the CSR 102 to provide audio input. The agent phone base 766 may also include a headset that provides audio output to the CSR 102. In one configuration, audio input provided to the microphone may be biased and pre-amplified via an agent microphone bias and pre-amplification component 770. Output from this component 770 may be input to an agent microphone amplifier 772. Output from this component 770 may also serve as agent input 736 to an computing device mixer 726.

In one example, a customer 118 may provide audio input and receive audio output via a customer phone base 768. Output from the customer phone base 768 may be referred to as the customer's voice 774. The customer's voice 774 and the amplified input from the agent's microphone 772 may be applied to a differential amplifier 778. The output of the amplifier 778 may be referred to as customer input 738 that is input to the computing device mixer 726.

The computing device 704 may include a soundcard to provide audio output from and audio input to the computing device 704. Audio output from the computing device 704 may be referred to as soundcard output 776. The soundcard output 776 may serve as computing device input 740 to the computing device mixer 726. As a result, the computing device mixer 726 may include three input channels (e.g., agent input 736, customer input 738, and computing device input 740). The computing device mixer 726 may also provide a single output to the computing device 704 (e.g., soundcard input). In one example, the single output may be provided to a differential amplifier 780.

As previously explained, the computing device 704 may provide instructions to the controller 720 via a communications link 782 (such as a USB connection). The instructions may indicate which input channels are to be cancelled and not outputted from the mixer 726. For example, the controller 720 may include three cancellation controls 788A, 788B, 788C for each input channel. These controls 788A, 788B, 788C may control the audio output levels of the three input channels 736, 738, 740.

As explained above, during the course of a call between a customer and a customer service representative, where sensitive data need to be gathered, the present systems and methods may perform this in conjunction with other tools (such as a customer relations management (CRM) application or stand-alone. Input fields may not be required in these other applications to accept and store the sensitive data. The user interface of the applications may be greatly simplified.

At the appropriate point during the call, the present systems and methods may be invoked. If the supporting application has been enhanced with certain application programming interfaces (APIs), the supporting application may push key data to the present systems and methods (such as name, amount of a charge, etc.). If no such interface is provided, then the present systems and methods may prompt for the required data to perform the transaction required.

In one embodiment, the present systems and methods may enable audio to be heard and detected for three participants of the call, controlling each using the multi-channel audio patch device 108 for six separate audio channels. In one example, two channels may be used for the caller (i.e., customer), one for input from the caller (INCALL), and a separate for output to the caller (OUTCALL). Two channels may be used for the CSR, one for input (INCSR), and a separate for output (OUTCSR). Lastly, two audio channels may be used for the channel controlling application 348. The input (INPC) is used to record the call, and the output (OUTPC) is used to play audio in a selected voice and language, prompting the caller to input data. The present systems and methods may control the audio level on each channel as well as which paths are enabled at any point during the call.

When sensitive data needs to be gathered, the CSR may instruct the caller how to input the data using the keypad of their telephone. At this point, the present systems and methods may put the INPC into a tone detection mode and will alter the audio signal captured in the recording such that no distinguishable tones are present. The OUTCSR channel may either be muted during the input of these tones, or a canceling audio signal may be injected onto the OUTCSR channel rendering the tones undetectable (e.g., altering) on that channel. The latter may be used as it allows the CSR to continue to participate in the conversation and hear any questions the caller might have. The present systems and methods may provide visual and/or audio indications to the CSR of successful tone detection, by simply displaying an asterisk character for each tone detected. Audible, yet altered, tones may also be played to provide audio indications of progress. Tones may be detected on the INPC channel by processing the signal of the microphone input of the sound card of the computing device 104 executing the channel controlling application 348.

The present systems and methods may or may not store the sensitive information. In one configuration, the present systems and methods may provide the sensitive data to a gateway or handling system, as explained above. In the case of credit card transactions, the data may be pushed to a payment gateway to process the transaction and await a response. The response may be returned in the form of a transaction identification and verification code. This may then be returned to the application (i.e., CRM) used by the CSR, and may be the only information that is stored. The response may not represent sensitive data.

Figure 8:
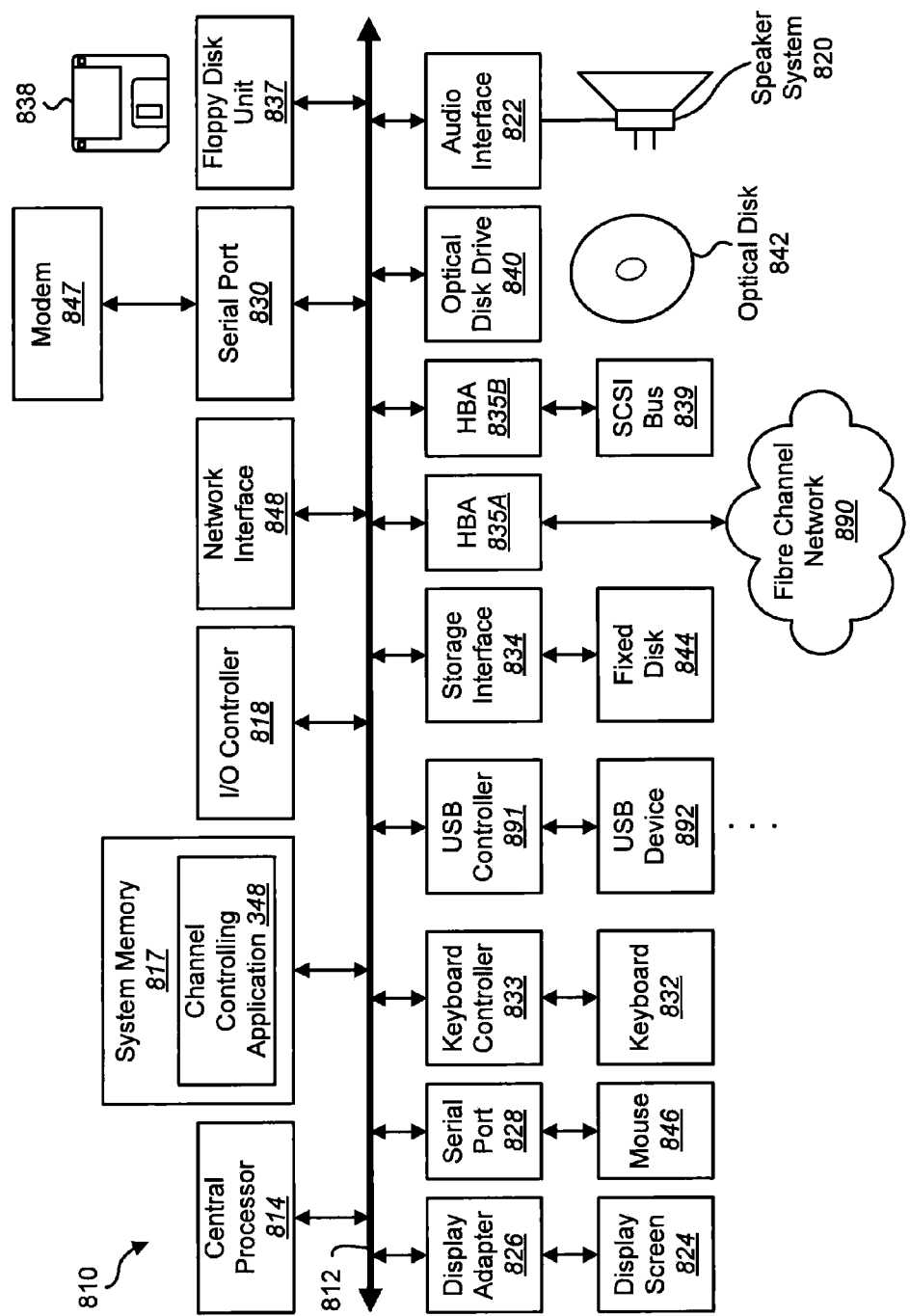
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 890), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the channel controlling application 348 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
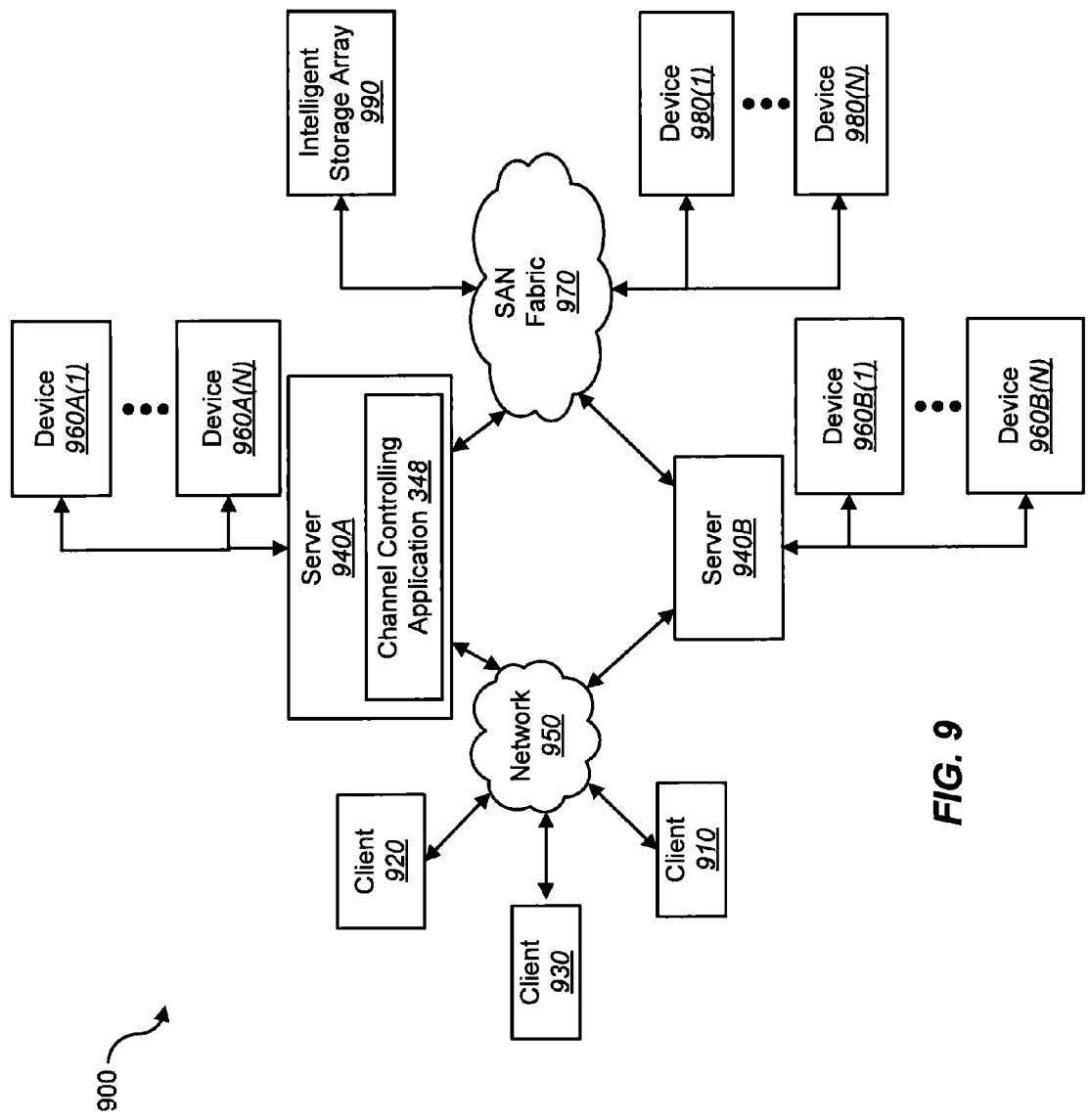
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A and 940B (any of which can be implemented using computer system 910), are coupled to a network 950. In one embodiment, the channel controlling application 348 may be located within a server 940A, 940B to implement the present systems and methods. The storage server 940A is further depicted as having storage devices 960A(1)-(N)

directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

The claims defining the invention are as follows:

1. A computer-implemented method to securely collect data over a telephone, comprising:
    monitoring, via a multi-channel audio patch device, telephone communications between a customer and a customer service representative;
    detecting at least one tone from a telephone keypad of the customer, wherein the at least one tone represents sensitive data for the customer;
    receiving, from a computing device connected to the multi-channel audio patch device, a cancellation signal;
    upon receiving the cancellation signal, preventing an audio output channel of the multi-channel audio patch device directed to the customer service representative from outputting a detectable tone from the telephone keypad of the customer;
    providing an indicator to the customer service representative when detection of the at least one tone occurs; and
    generating an authorization recording that includes a summary of a transaction between the customer and the customer service representative, at least a portion of the authorization recording comprising an audio recording.

2. The method of claim 1, further comprising transmitting an authorization request to the customer.

3. The method of claim 2, further comprising receiving a response to the authorization request.

4. The method of claim 1, further comprising transmitting the authorization recording to the customer.

5. The method of claim 1, further comprising masking the at least one tone from the telephone keypad of the customer that represents sensitive data for the customer.

6. The method of claim 5, further comprising converting the masked at least one tone from the telephone keypad of the customer to an unmasked tone.

7. The method of claim 1, further comprising converting the detected at least one tone to sensitive data for the customer.

8. The method of claim 7, further comprising transmitting the sensitive data for the customer to a secure data storage.

9. A computing device configured to securely collect data over a telephone, comprising:
    a processor;
    memory in electronic communication with the processor;
    instructions being stored in the memory and being executable by the processor to:
        monitor, via a multi-channel audio patch device, telephone communications between a customer and a customer service representative;
        detect at least one tone from a telephone keypad of the customer, wherein the at least one tone represents sensitive data for the customer;
        receive, from a computing device connected to the multi-channel audio patch device, a cancellation signal;
        upon receiving the cancellation signal, prevent an audio output channel of the multi-channel audio patch device directed to the customer service representative from outputting a detectable tone from the telephone keypad of the customer;
        provide an indicator to the customer service representative when detection of the at least one tone occurs; and generate an authorization recording that includes a summary of a transaction between the customer and the customer service representative, at least a portion of the authorization recording comprising an audio recording.

10. The computing device of claim 9, wherein the instructions are executable by the processor to:
transmit an authorization request to the customer.

11. The computing device of claim 10, wherein the instructions are executable by the processor to:
receive a response to the authorization request.

12. The computing device of claim 9, wherein the instructions are executable by the processor to:
transmit the authorization recording to the customer.

13. The computing device of claim 9, wherein the instructions being executable by the processor to:
mask the at least one tone from the telephone keypad of the customer that represents sensitive data for the customer.

14. The computing device of claim 13, wherein the instructions being executable by the processor to:
convert the masked at least one tone from the telephone keypad of the customer to an unmasked tone.

15. The computing device of claim 9, wherein the instructions being executable by the processor to:
convert the detected at least one tone to sensitive data for the customer.

16. The computing device of claim 15, wherein the instructions being executable by the processor to:
transmit the sensitive data for the customer to a secure data storage.

17. A computer-program product to securely collect data over a telephone, the computer-program product comprising a computer-readable storage medium device having instructions thereon, the instructions comprising:
monitor, via a multi-channel audio patch device, telephone communications between a customer and a customer service representative;
detect at least one tone from a telephone keypad of the customer, wherein the at least one tone represents sensitive data for the customer;
receive, from a computing device connected to the multi-channel audio patch device, a cancellation signal;
upon receiving the cancellation signal, prevent an audio output channel of the multi-channel audio patch device directed to the customer service representative from outputting a detectable tone from the telephone keypad of the customer;
provide an indicator to the customer service representative when detection of the at least one tone occurs; and
generate an authorization recording that includes a summary of a transaction between the customer and the customer service representative, at least a portion of the authorization recording comprising an audio recording.

18. The computer-program product of claim 17, wherein the instructions being executable by the processor to:
transmit an authorization request to the customer.

19. The computer-program product of claim 18, wherein the instructions being executable by the processor to:
receive a response to the authorization request.

20. A multi-channel audio patch device configured to securely collect data over a telephone, comprising:
a plurality of multiplexers, wherein each multiplexer comprises a plurality of audio input channels and a single audio output channel, the multi-channel audio patch device configured to monitor communications between a customer and a customer service representative;
a microcontroller connected to a computing device, the microcontroller configured to provide control signals, received from the computing device, for the plurality of audio input channels and the single audio output channel for each of the plurality of multiplexers, wherein the microcontroller cancels the single output of a multiplexer directed to the customer service representative when audio tones from a telephone keypad of the customer are detected; and
wherein one of the plurality of multiplexers is configured to output an authorization recording to the customer that includes a summary of a transaction between the customer and the customer service representative, at least a portion of the authorization recording comprising an audio recording.

* * * * *